United States Patent [19]

Viertel et al.

[11] Patent Number: 5,895,087
[45] Date of Patent: Apr. 20, 1999

010368
[54] SUN VISOR FOR VEHICLES

[75] Inventors: Lothar Viertel, Altforweiler, Germany; Patrick Welter, La Chambre, France

[73] Assignee: Becker Group Europe GmbH, Wuppertal, Germany

[21] Appl. No.: 08/922,689

[22] Filed: Sep. 2, 1997

[30] Foreign Application Priority Data

Mar. 9, 1996 [DE] Germany .................. 196 35 684

[51] Int. Cl.⁶ ............................................ B60J 3/02
[52] U.S. Cl. ................................ 296/97.5; 296/97.1
[58] Field of Search ............................ 296/97.1, 97.2, 296/97.5; 362/135, 140, 144

[56] References Cited

U.S. PATENT DOCUMENTS

| | | | |
|---|---|---|---|
| 4,075,468 | 2/1978 | Marcus | 296/97.5 X |
| 4,494,789 | 1/1985 | Flowerday | 296/97.5 |
| 4,685,723 | 8/1987 | Candas | 296/97.5 |
| 4,866,579 | 9/1989 | Miller et al. | 362/144 |
| 5,078,445 | 1/1992 | VandenBerge et al. | 362/135 X |
| 5,340,186 | 8/1994 | Aymerich et al. | |
| 5,401,073 | 3/1995 | Viertel et al. | 296/97.5 X |
| 5,454,616 | 10/1995 | Aymerich et al. | 296/97.5 X |
| 5,477,429 | 12/1995 | Viertel et al. | 362/135 X |

FOREIGN PATENT DOCUMENTS

| | | |
|---|---|---|
| 0 196 961 | 10/1986 | European Pat. Off. . |
| 82 01 176 U | 6/1982 | Germany . |
| 33 22 733 A1 | 1/1985 | Germany . |

OTHER PUBLICATIONS

German Patent Office, Search Report (Feb. 4, 1997) for foreign counterpart application DE 196 35 684.9.

*Primary Examiner*—Joseph D. Pape
*Attorney, Agent, or Firm*—Brinks Hofer Gilson & Lione

[57] ABSTRACT

A sun visor for vehicles has a sun visor body produced as a blow-molded body, which has a seating housing for a sun visor shaft as well as a counter-seating pin and a tub-shaped depression for receiving a complementary component. This sun visor has sidewalls in the tub-shaped depression with a circumferential seating flange formed by a step-shaped shoulder. Stiffening beads are exclusively disposed at the bottom of the tub-shaped depression and are supported on the interior wall of the adjoining broad side of the sun visor body. Holes for receiving fastening elements of a complementary component are provided in the bottom of the tub-shaped depression.

8 Claims, 4 Drawing Sheets

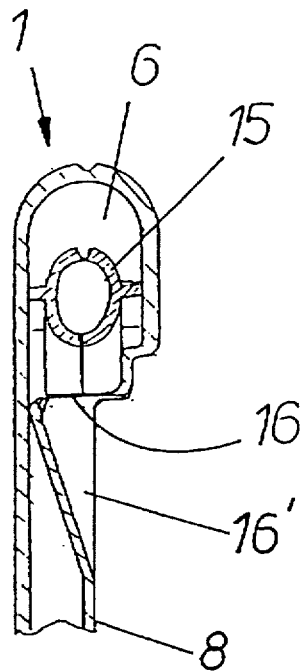
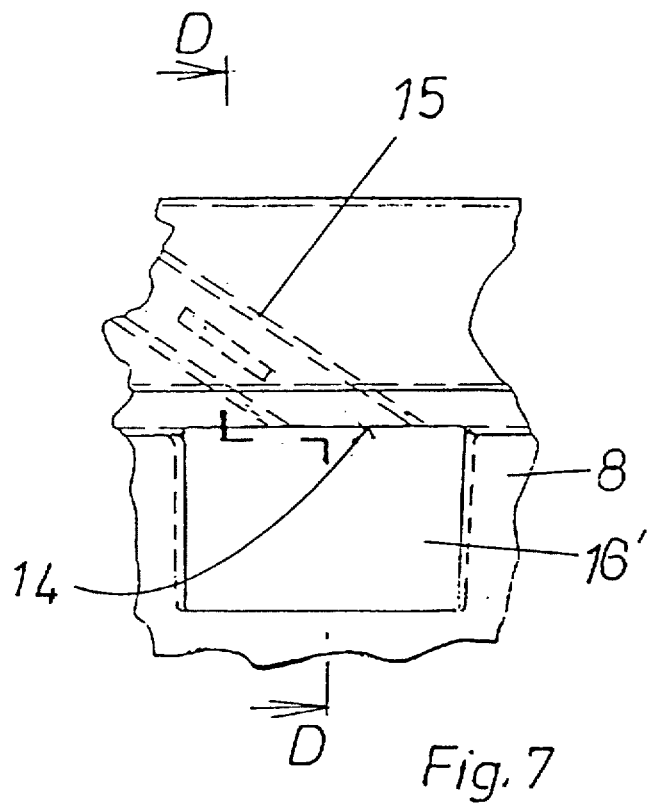
Fig. 8   Fig. 7
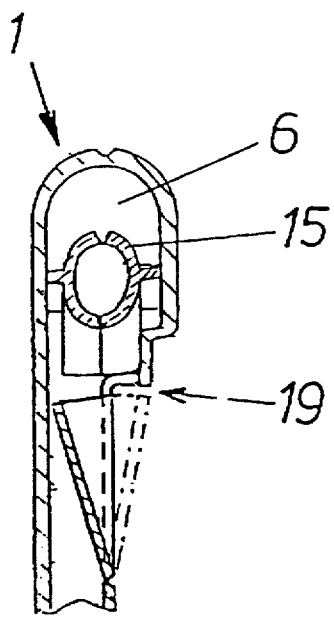
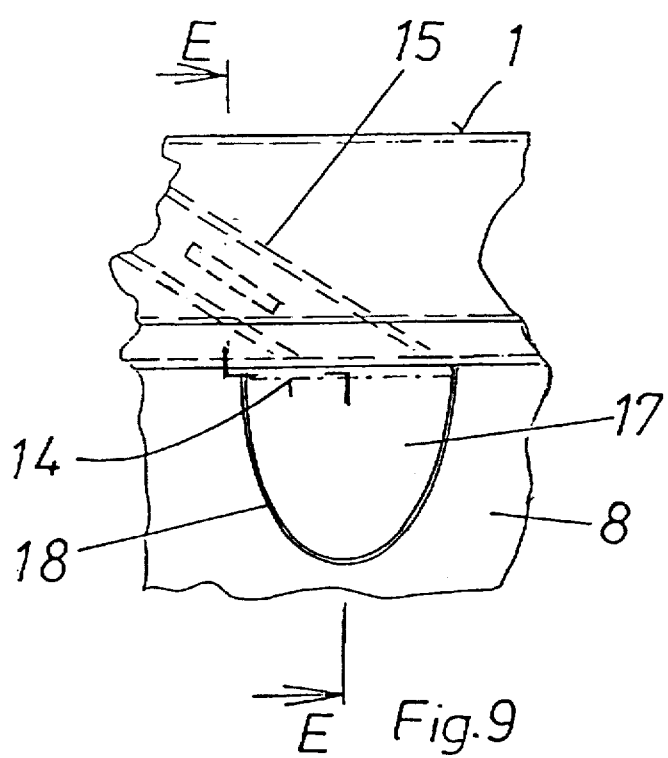
Fig. 10   Fig. 9

SUN VISOR FOR VEHICLES

FIELD OF THE INVENTION

The invention relates to a sun visor for vehicles, having a hollow sun visor body produced as a blow-molded body.

BACKGROUND OF THE INVENTION

A sun visor for motor vehicles is represented in European Patent Publication EP 0 562 085 B1, which has a hollow sun visor body embodied as a blow-molded body. A securing spring for receiving a portion of the sun visor shaft is located in one corner area of the sun visor body. A tub-shaped depression for receiving a mirror is located in one broad side of the sun visor body. The sun visor body is surrounded by a sheath-like exterior cover. So that the sun visor body of the known sun visor is given a great mechanical sturdiness, the interior, oppositely located sides of the sun visor body are provided with a plurality of stiffening ribs which face the interior of the sun visor body and which have been produced by stamping from the direction of the exterior of the sun visor body, wherein every rib is hollow and fixes a small bore on the exterior surface of the corresponding side of the sun visor body. The visible openings in the sun visor body formed by the ribs are covered by the sheath-like cover.

OBJECT AND SUMMARY OF THE INVENTION

It is the object of the instant invention to simplify the production of a sun visor of the type mentioned above and to provide in particular that it is no longer necessarily required to cover the sun visor body with a sheathing material.

This invention provides a sun-visor with a hollow blow-molded body. The sun visor has an approximately rectangular shape and has in one corner area an embedded seating housing with a seating bore for the one-ended seating of a sun visor shaft, whose other end is received in a small seating bracket and is clamped by a detent spring received in the seating housing, which furthermore has a counter-seating pin, which forms a hinge shaft with the sun visor shaft, in the end area facing away from the seating housing.

The sun visor, furthermore, is provided at one broad side with a tub-shaped depression for receiving a complementary component. The sidewalls of the tub-shaped depression have a circumferential seating flange formed by a step-shaped shoulder. Holes for receiving fastening elements of the complementary component are provided in the bottom of the tub-shaped depression. The depression may include stiffening beads. The stiffening beads are preferably exclusively disposed at the bottom of the tub-shaped depression in the form of diagonally extending, crossing stiffening ribs, which are supported on the interior wall of the adjoining broad side of the sun visor body.

It has been shown in a surprising manner that it was possible to create a sun visor body by means of the step-shaped shoulder and by the stiffening beads exclusively formed in the bottom of the tub-shaped depression, which meets the technical requirements in every respect, as could be established by a series of tests. The holes in the bottom of the tub-shaped depression are used for the particularly simple fastening of a complementary component and, regardless of other tasks and functions, the complementary component hides the holes and stiffening beads from the view of an observer. The sun visor body of the sun visor in accordance with the invention therefore has a smooth surface free of interruptions, so that it is basically possible to omit the sheathing of the sun visor body with a sheathing material, particularly if plastic foils of arbitrarily selected color are used. However, the sun visor bodies can also be sheathed in the customary manner if desired by the customer.

The stiffening beads are connected by a material-to-material contact with the interior wall of the adjoining broad side of the sun visor body. This can be achieved in the simplest way by means of the deformation heat during blow-molding of the sun visor body.

A further development of the invention provides that one lateral wall of the tub-shaped depression has a zone which can be opened, and that a passage for conducting electrical supply lines through it extends between this zone and the seating bore of the seating housing. This embodiment is particularly important, if the complementary component is to be inserted into the tub-shaped depression of the sun visor body in the form of a mirror component equipped with an electric lighting device.

The passage suitably consists of a tube-shaped shoulder on the seating housing.

Besides the mirror component equipped with an electrical lighting device, a covering closure can be considered as a complementary component, and also a mirror surrounded by a frame.

The covering closure, the frame or the mirror component can be equipped with anchoring elements, for instance in the shape of harpoons, disposed on the back, so that the arrangement of the respective complementary component in the tub-shaped depression can take place by a plug assembly, which can be performed particularly rapidly and simply.

A further embodiment of the invention provides that an adapter frame with fastening elements on the top and bottom is used for holding the complementary component. This has the particular advantage that existing standard components can be used for equipping the novel sun visor body.

An exemplary embodiment of the invention will be described in greater detail below, making reference to the drawings.

BRIEF DESCRIPTION OF THE DRAWINGS

FIG. 7 shows a detail of the sun visor body.

FIG. 8 shows a cross-section view D—D of the sun visor of FIG. 7.

FIG. 9 represents an alternate embodiment detail of the sun visor body from that of FIG. 7.

FIG. 10 shows a cross-section view E—E of the sun visor of FIG. 9.

DETAILED DESCRIPTION OF THE PREFERRED EMBODIMENT

Figure 1:
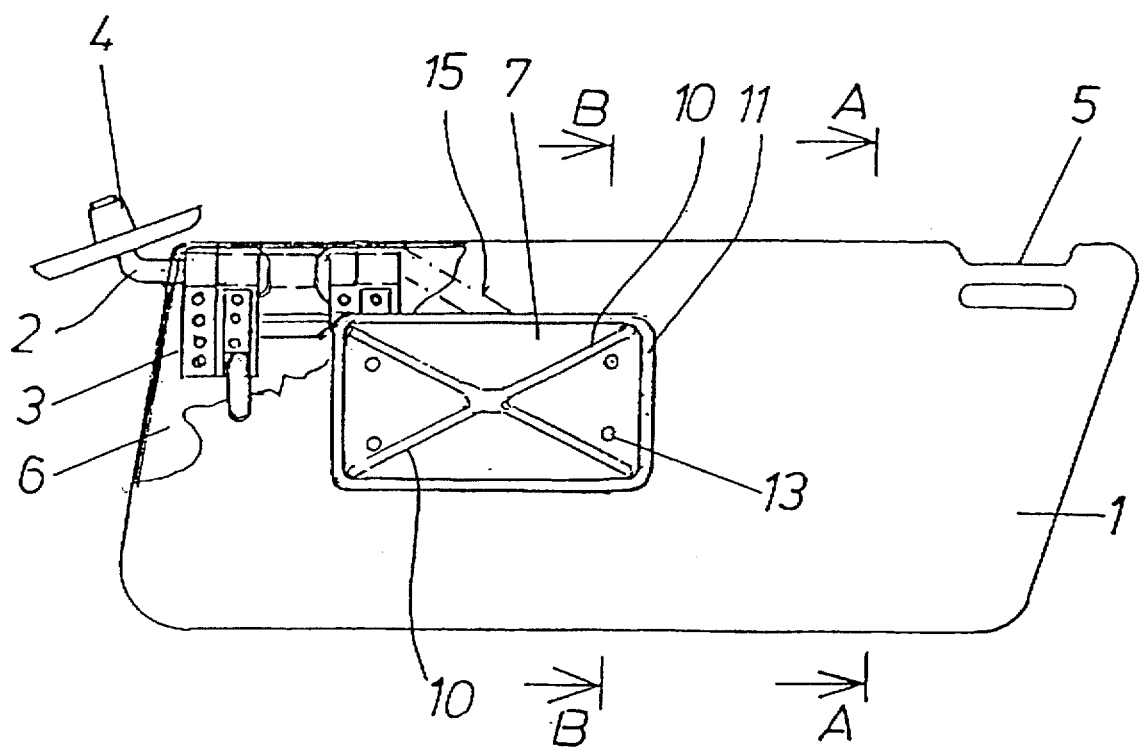
FIG. 1 represents a plan view, partially broken open, of a sun visor.

Referring to FIG. 1, the sun visor consists of a sun visor body 1, a sun visor shaft 2, which engages with one end area a seating housing 3 seated in the sun visor body 1 and whose other end area is received in a small seating bracket 4, and of a small counter-seating bracket (not represented) for the releasable seating of a counter-seating pin 5 embodied on the sun visor body 1.

The sun visor body 1 is produced as a hollow blow-molded body, wherein the counter-seating pin 5 constitutes a one-piece component of the same material as the sun visor body 1. The seating housing 3 is inserted into one corner area of the sun visor body 1, namely inside the hollow space 6, wherein the term "inserted" also is understood to mean "anchored."

Figure 3:
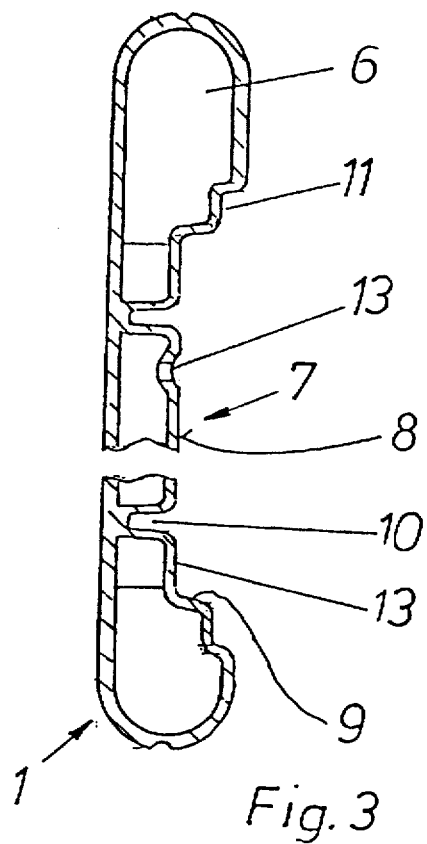
FIG. 3 shows a cross-section view B—B of the sun visor of FIG. 1.

Referring now to FIG. 3, the sun visor body 1 has a tub-shaped depression 7 with a bottom 8 and circumferential lateral walls 9 on one broad side.

Two diagonally extending stiffening beads 10, which cross at the center, are formed in the bottom 8, and are at least supported on the interior wall of the adjoining broad side. A material-to-material connection is preferred, which results without any additional further action by means of the shaping heat during blow molding of the sun visor body 1. Holes 13 are furthermore provided in the bottom 8 of the tub-shaped depression 7. The bottom 8 is spaced apart from the adjoining broad side of the sun visor body 1. The lateral walls 9 of the tub-shaped depression 7 are provided with a circumferential seating flange 11 formed by a step-shaped shoulder. Additional stiffening of the sun visor body 1 is achieved by means of this, and a receiver for a complementary component 12 (see FIGS. 4–6 and 11–13), still to be explained, is formed.

Figure 4:
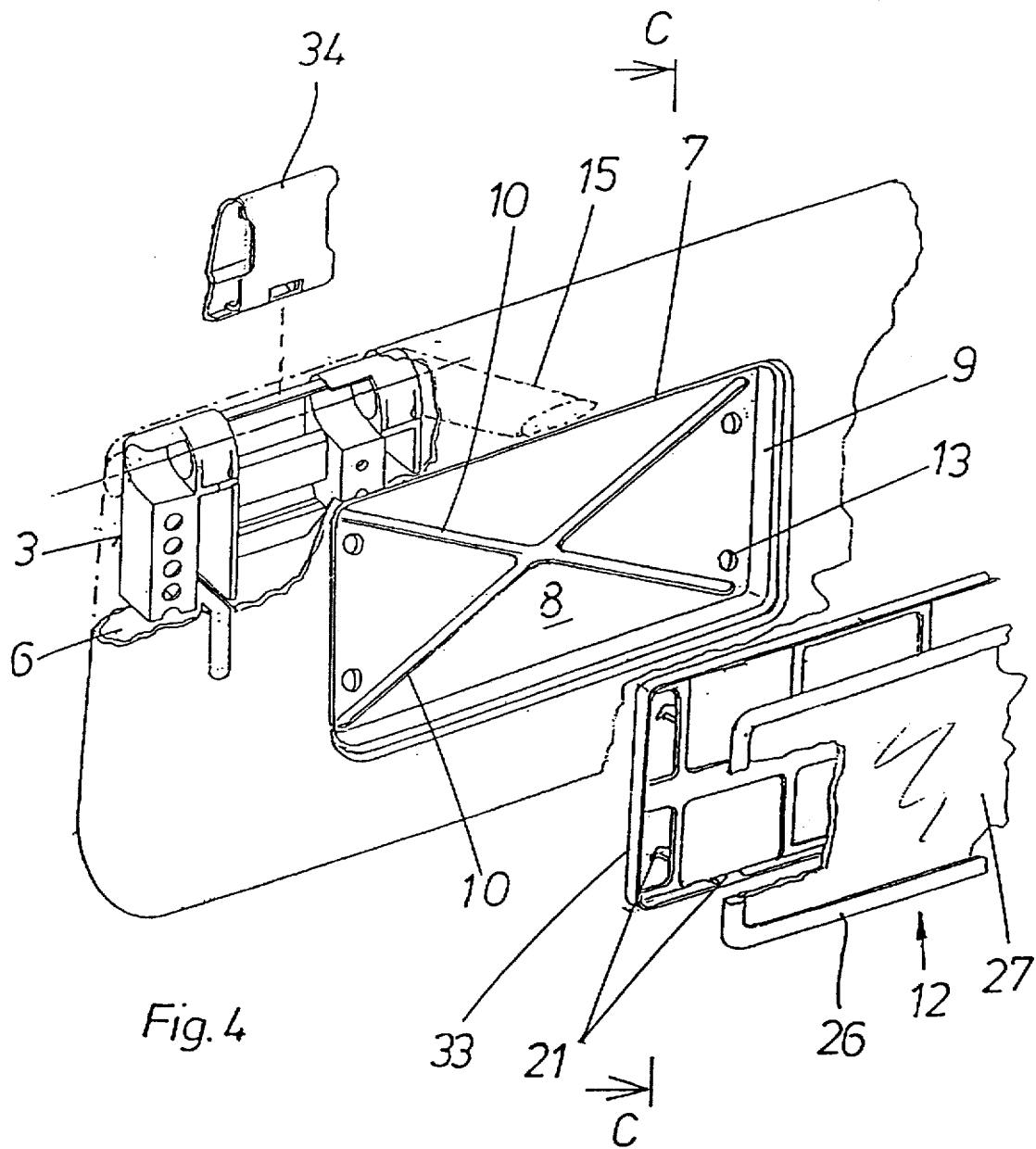
FIG. 4 represents a partially broken open end area of a sun visor body in a perspective exploded view.

A lateral wall 9 of the tub-shaped depression 7 has a zone 14 (see FIGS. 7 and 9), which can be opened. A passage for feeding electrical supply lines extends between this zone 14 and the seating bore of the seating housing 3. Preferably, the passage consists of a tube-shaped shoulder 15 on the seating housing 3, as shown in FIG. 4.

In accordance with FIGS. 7 and 8, the zone, which can be opened, can be formed as a pocket-like trough 16' locally provided in the bottom 8. A thin flash 16, which can easily be penetrated, is created because of the predetermined dimensions of the tool of the blow mold.

However, in accordance with FIGS. 9 and 10, the zone, which can be opened, can be created as a cup 17 locally formed on the bottom 8, which has a thinning 18 of its material on its circumference. By cutting the zone 14 which can be opened, a free cut 19 is created, through which the cup 17 can be pushed. Based on the past-dead-center effect, the originally outward oriented arch is now permanently oriented toward the inside.

Based on its described embodiment, the tub-shaped depression 7 is used for stiffening the sun visor body 1 in a way which satisfies technical requirements and, as mentioned, for receiving a complementary component 12.

Figure 6:
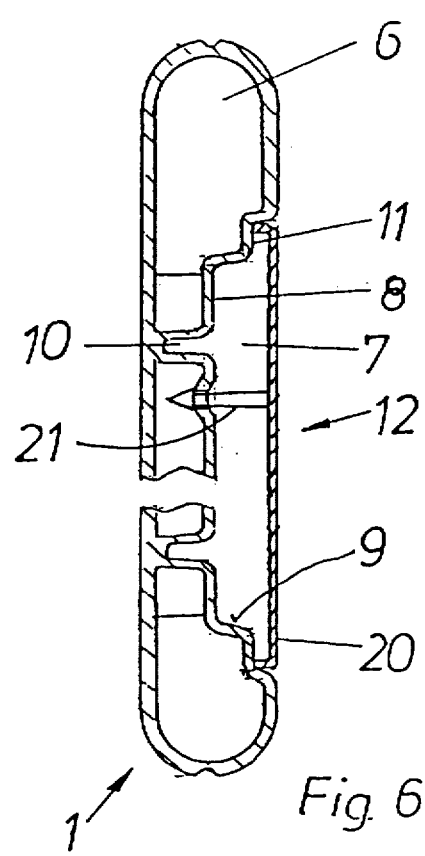
FIG. 6 is a cross-section view C—C of the sun visor of FIG. 4 with a complementary component differing from the one in FIG. 5.

In the simplest embodiment, represented in FIG. 6, the complementary component 12 consists of a covering closure 20 which covers the depression 7. The circumferential rim of the component 12 is supported on the seating flange 11 and is held by the harpoon-like designed detent elements 21 penetrating through the holes 13. The covering closure 20 can be matched in color to the sun visor body 1 or can also have a complementary color, a company logo or any other arbitrary ornamentation, so that the covering closure 20 can easily add to the good appearance of the sun visor.

Figure 11:
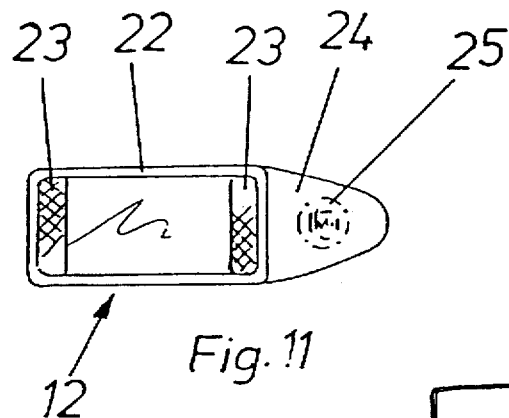
FIGS. 11 to 13 show alternate embodiments of a complementary component.

FIG. 11 represents a complementary component 12 embodied as a mirror component 22, wherein behind the transparent lenses 23, this mirror component 22 is equipped with an electric lighting system. A company logo 25, or any other ornamentation, may be applied to an extension 24 of the housing.

Figure 12:
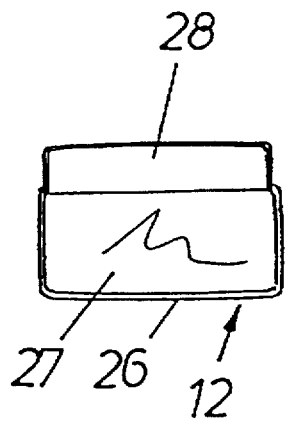

FIG. 12 represents a mirror 27 surrounded by a frame 26 as the complementary component 12. In this embodiment tilting cover 28 for covering the mirror 27 is hinged on the frame 26.

Figure 13:
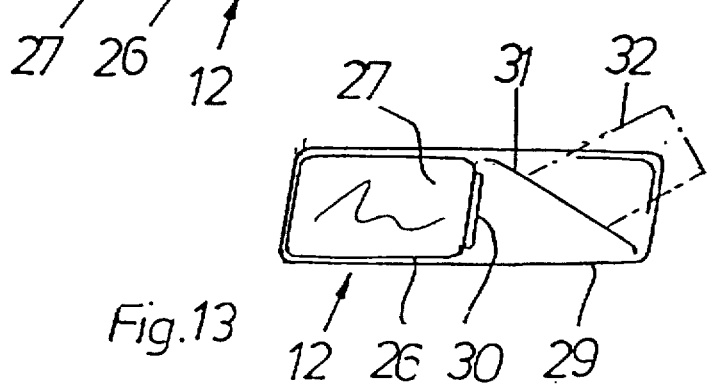
Figure 2:
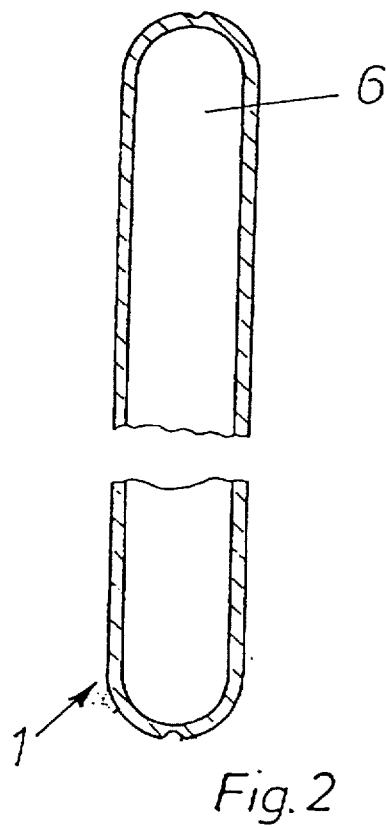
FIG. 2 shows a cross-section view A—A of the sun visor of FIG. 1.

FIG. 13 shows a complementary component 12 with a mirror 27 surrounded by a frame 26. In this embodiment, an extension 29 is arranged on the frame 26. The extension 29 receives a sliding cover 30 for the mirror 27, and can hold a parking lot ticket 32, or the like, in an obliquely extending opening slit 31.

Figure 5:
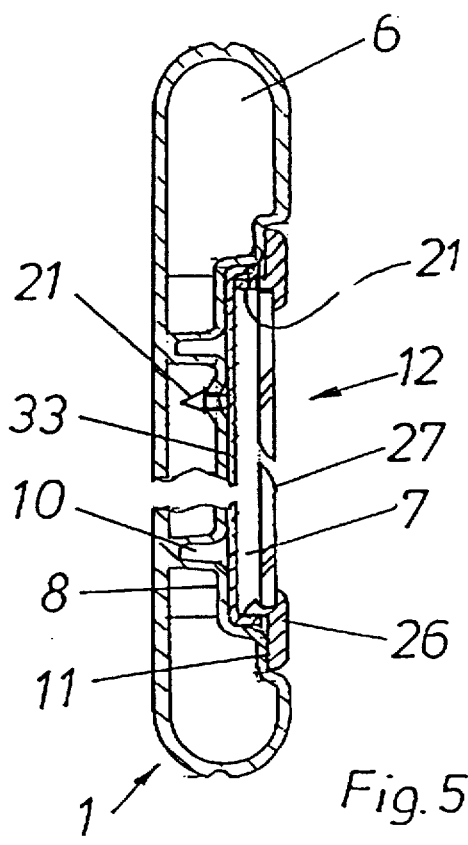
FIG. 5 is a cross-section view C—C of the sun visor of FIG. 4.

In FIGS. 4 and 5, a mirror 27 held by a frame 26 is received in the tub-shaped depression 7 by means of an adapter frame 33. The adapter frame 33 has detent elements 21 formed on its underside, which are matched to the pattern of holes in the bottom 8. The frame 33 may also be provided with detent elements 21 formed on the top, which are matched to fastening openings in the frame 26. In this case, it is assumed that the complementary component 12 is a standard component which is also used in conventional sun visors.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

We claim:

1. A sun visor for vehicles comprising:

a hollow sun visor body produced as a blow-molded body having an approximately rectangular shape, the body further having:

an embedded seating housing in a first corner area with a seating bore for the one-ended seating of a sun visor shaft that is clamped by a detent spring received in the seating housing, a counter-seating pin in a second corner area that forms a hinge shaft with the sun visor shaft, and a tub-shaped depression in a first broad side for receiving a complementary component, the tub-shaped depression including:

a plurality of stiffening beads exclusively disposed at the bottom of the tub-shaped depression and supported on an interior wall of a second adjoining broad side of the sun visor body, side walls at the periphery of the tub-shaped depression with a circumferential seating flange formed by a step-shaped shoulder, and at least one hole in the bottom of the tub-shaped depression for receiving fastening elements to hold the complementary component.

2. The sun visor in accordance with claim 1 wherein the stiffening beads are connected by a material-to-material contact with the interior wall of the adjoining broad side of the sun visor body.

3. The sun visor in accordance with claim 1 further comprising a zone which can be opened in a lateral wall of the tub-shaped depression, and a passage for conducting electrical supply lines extending between this zone and the seating bore of the seating housing.

4. The sun visor in accordance with claim 3 wherein the passage consists of a tube-shaped shoulder on the seating housing.

5. The sun visor in accordance with claim 1 further comprising a complementary component received in the tub-shaped depression.

6. The sun visor in accordance with claim 5 wherein the complementary component is selected from the group consisting of a covering closure, a mirror enclosed by a frame, and a mirror component equipped with an electrical lighting device.

7. The sun visor in accordance with claim 5 wherein the complementary component includes fastening elements provided on the back for engagement with the holes provided in the bottom of the tub-shaped depression.

8. The sun visor in accordance with claim 5 further comprising an adapter frame with fastening elements provided on the top and bottom of the frame for holding the complementary component to the sun visor.

* * * * *